United States Patent [19]
Drexler

[11] Patent Number: 4,745,268
[45] Date of Patent: May 17, 1988

[54] PERSONAL INFORMATION CARD SYSTEM

[75] Inventor: Jerome Drexler, Los Altos Hills, Calif.

[73] Assignee: Drexler Technology Corporation, Mountain View, Calif.

[21] Appl. No.: 822,067

[22] Filed: Jan. 24, 1986

Related U.S. Application Data

[63] Continuation-in-part of Ser. No. 693,856, Jan. 22, 1985, Pat. No. 4,692,394, which is a continuation-in-part of Ser. No. 443,596, Nov. 22, 1982, Pat. No. 4,503,135, which is a continuation-in-part of Ser. No. 238,832, Feb. 27, 1981, Pat. No. 4,360,728, and a continuation-in-part of Ser. No. 238,833, Feb. 27, 1981, and a continuation-in-part of Ser. No. 721,384, Apr. 9, 1985.

[51] Int. Cl.$^4$ ............................................. G06K 19/00
[52] U.S. Cl. ..................................... 235/487; 235/454; 235/488
[58] Field of Search ............................. 235/454, 487; 346/135.1

[56] References Cited

U.S. PATENT DOCUMENTS

| | | | |
|---|---|---|---|
| 4,151,667 | 5/1979 | Idelson et al. | 40/2.2 |
| 4,213,038 | 7/1980 | Silverman et al. | 235/382 |
| 4,236,332 | 12/1980 | Domo | 40/2.2 |
| 4,663,518 | 5/1987 | Borror et al. | 235/487 |

*Primary Examiner*—David L. Trafton

[57] ABSTRACT

A system in which wallet-sized visually readable information relating to a person is created on material disposed on one side of a wallet-size card and machine readable information relating to the person is recorded on a laser recordable optical data storage strip disposed on the opposite side of the card. The visually readable information may be a fingerprint or face photograph created by conventional photography or with a laser. The data storage strip is disposed in the card and may be a pre-formed strip of laser recording material. Information spots recorded on the strip may be insurance, medical, banking, security or other transaction information. Both the machine readable information and the eye readable information are read simultaneously by two optical systems, one disposed on each side of the card.

15 Claims, 3 Drawing Sheets

PERSONAL INFORMATION CARD SYSTEM

CROSS REFERENCES TO RELATED APPLICATIONS

This is a continuation-in-part of patent application Ser. No. 693,856 filed Jan. 22, 1985, now U.S. Pat. 4,692,394, which is a continuation-in-part of patent application Ser. No. 443,596 filed Nov. 22, 1982, now U.S. Pat. No. 4,503,135, granted Mar. 5, 1985, which is a continuation-in-part of patent application Ser. No. 238,832 filed Feb. 27, 1981, now U.S. Pat. No. 4,360,728, granted Nov. 23, 1982 and patent application Ser. No. 238,833 filed Feb. 27, 1981. This application is also a continuation-in-part of application Ser. No. 721,384 filed Apr. 9, 1985.

TECHNICAL FIELD

The invention relates to optical data information storage and more particularly to a system for recording and reading personal information on an information card containing both eye readable images and laser recorded machine readable data.

BACKGROUND ART

Identification cards have used magnetic data strips in conjunction with photographic prints of the card owner.

In U.S. Pat. No. 4,236,332, Domo discloses a medical record card containing a microfilm portion having some data visible to the eye and other data visible by magnification. The directly visible data is alphanumeric character codes pertaining to emergency medical conditions of the patient and the magnifiable data portions detail the medical history.

Silverman et al. teach in U.S. Pat. No. 4,213,038, an access control system with an identification card. The card has machine recordable indicia used to choose a master microspot pattern from the machine's memory. This master pattern is compared with an identical pattern on the card for verification. The card also has space for a picture and a signature. Similarly, Idelson et al. in U.S. Pat. 4,151,667, teach an identification card having a photograph and a phosphorescent bar code pattern used for verification.

The amount of information these cards can hold is extremely limited. Data visible to the eye occupies a considerable amount of space on a card, which further limits the amount of information that can be stored. In the patent to Idelson et al., the photograph and bar code pattern overlap. Random microspot patterns can only be used for verification, while bar codes can only represent a small amount of specific data. The prior art does not provide for simultaneous reading of machine readable and eye readable information.

An object of the invention is to provide a method of recording personal information on a card, both a visual image and data to accompany that image either prior to, during, or after exposure forming such image, where the data does not overlap the visual image and to provide for simultaneous reading of both types of data.

DISCLOSURE OF THE INVENTION

The above object has been met by creating visually readable information on a piece of laser recordable material or on photographic material and recording related data in situ on a strip of laser recordable material disposed on opposite sides of a wallet-size card. The visually readable information, which is adhered to an inner or outer surface on one side of the card, relates to a person, and may, for example, consist of a face image or fingerprint. A laser beam records data on the strip of optical storage material, in situ, either by ablation, melting, physical or chemical change, thereby forming spots representing changes in reflectivity. The recording process produces differences in reflectivity detectable by a light detector. In this manner data concerning the person may be recorded and read directly from the strip. Since visually readable information and laser written data are disposed on opposite sides of the card, no overlapping occurs and a wider data strip with greater information capacity may be used.

The uniform surface reflectivity of this reflective strip before recording typically would range between 20% and 65%. For a highly reflective strip, the average reflectivity over a laser recorded spot might be in the range of 5% to 25%. Thus, the reflective contrast ratio of the recorded spots would range between 2:1 and 4:1. Laser recording materials are known in the art that create either low reflectivity spots in a reflective field or high reflective spots in a low reflectivity field. An example of the latter type is described in U.S. Pat. No. 4,343,879. When the reflectivity of the field is in the range of 8% to 20% the reflective spots have a reflectivity of about 40%. The reflective contrast ratio would range from 2:1 to 5:1. Photographic pre-formatting, as described, for example, in U.S. Pat. No. 4,304,848, would create spots having a 10% reflectivity in a reflective field or 40% in a low reflectivity field.

By means of in situ laser recording, transaction data, information, or the like related to the photographic image is recorded at subsequent times. For example, insurance claims or medical record entries may be processed sequentially, recording various transactions on the strip one after another, without erasing data. Digital voice recordings or signatures could also be recorded. A photograph of the claimant would protect against fraudulent use of the card. A card reader, capable of simultaneously reading machine readable data and projecting eye readable data gives a user adequate information for making a human judgment regarding a new transaction.

BEST MODE FOR CARRYING OUT THE INVENTION

Figure 1:
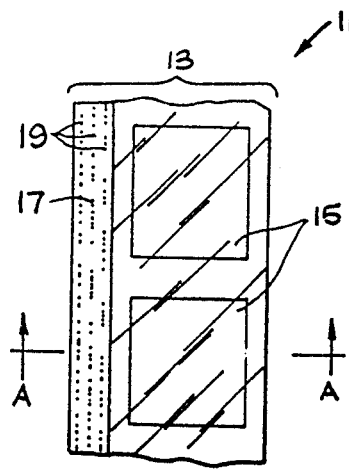
FIG. 1 is a top view of a first embodiment of the recording medium of the present invention.

With reference to FIG. 1, the data medium used in the present invention may be seen to comprise a photographic medium 11 having a planar major surface 13 which is divided into a visual image area 15 and a data strip 17. Visual image medium 11 is in sheet form disposable on a wallet-size card. The visual image area 15 can be conventional photographic images, produced by usual photographic techniques, typically by exposure and development of the medium. Alternatively, a laser can be used to create eye-readable visual images on a thin laser recording medium. The image areas 15 may occupy the entirety of the visual image medium, except for the data strip, or discrete areas as shown in FIG. 1. Several images may be disposed on the photographic medium. Alternatively, only a single image may be on the medium.

The present invention uses an optical data strip 17 which may have prerecorded information, but must have user written information, written on the strip in situ. The type of material that may be used is relatively highly reflective material which forms a shiny field against low reflectivity spots such as pits, craters, holes or dark spots in the reflective surface which tend to be absorptive of light energy. The contrast differences between the low reflectivity spots and the shiny reflective field surrounding the spots cause variations at a detector when the spots are illuminated by light of lesser intensity than the light that originally created the spots. Alternatively, a low reflectivity material may be used which creates high reflectivity spots when recorded with a laser.

Data strip 17 is intended to provide a personal data record accompanying the visual images on the same material just as a movie sound track accompanies a sequence of frames of film. Data is written in individual tracks extending a longitudinal direction, as indicated by the spot patterns 19 and these spot patterns are analogous to sound track on a film, except that the data tracks contain a much higher density of information and are usually read in reflection, rather than in transmission. The information density is greater because each of the spots in the spot pattern is approximately 5–25 microns in size with a spacing of about 5–25 microns between spots. The spots may be either digital or analog data, and can be circular or oblong, but in any case are recorded by a laser in the usual way, for example as shown in U.S. Pat. No. 4,278,756 to Bouldin, et al.

Figure 2:
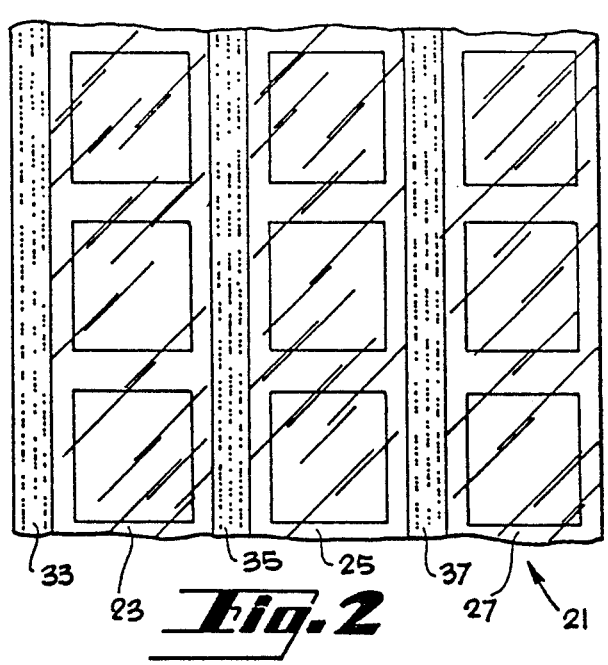
FIG. 2 is a top view of the second embodiment of the present invention.

FIG. 2 is similar to FIG. 1 except that a larger visual image medium 21 is used with a plurality of rows of images 23, 25, and 27. Accompanying each row of images is a corresponding data strip 33, 35 and 37. These data strips are analogous in construction to the strip of FIG. 1. Once again, it is not necessary that each row have individually different images. Each row may consist of either multiple images or a single image. The embodiment of FIG. 2 is a microfiche type medium where each row of images would have corresponding data on a data strip. The images are such that they can be viewed with the naked eye or with low power (magnification) optical systems. On the other hand, the data strips are not usually read with the naked eye, but require either microscopic inspection or preferably reading by reflection of a scanning laser or light emitting diode beam as explained below. However, a laser could record visual images such as serial numbers, personal data, or even face images on the laser recordable material.

Figure 3:
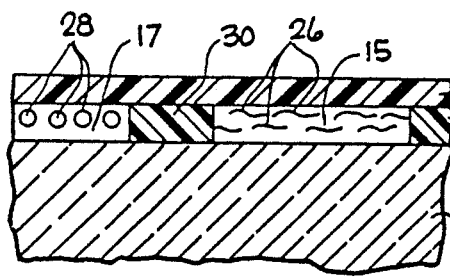
FIGS. 3–6 are alternate sectional constructions of the medium of FIG. 1 taken along lines A—A in FIG. 1.

FIG. 3 illustrates a first construction of the recording medium shown in FIG. 1. The sectional view includes a substrate 22 which is transparent and may be one of the many polymeric substrate materials known in photographic arts. Applied to the substrate 22 is a subbing layer, not shown, and an emulsion layer 24. This emulsion layer has a photographic image area 15 made by exposure and development in the usual way. The wavy lines 26 represent filamentary silver particles which characterize normal photographic images. Data strip 17 is one of many laser recording materials. For example, it could be a reflective silver/gelatin layer converted from silver-halide emulsion having fine grain size, less than 0.1 microns, by a silver diffusion transfer process described in U.S. Pat. No. 4,312,938 (Drexler and Bouldin), incorporated by reference herein. Such material is known as DREXON, a registered trademark of Drexler Technology Corporation, and is sold by said firm.

In the referenced patented process, silver halide emulsion is exposed to a non-saturating level of actinic radiation to activate silver halide. The activated emulsion is then photographically developed to a gray color of an optical density of 0.05–2.0 to red light, forming an absorptive underlayer. There is no fixing after this first development step. The surface of the emulsion strip is then fogged by a fogging agent such as borohydride to produce silver precipitating nuclei from the part of the unexposed and undeveloped silver halide emulsion. The strip is then contacted with a monobath containing a silver halide solvent and a silver reducing agent to complex, transfer and reduce the remaining unexposed and undeveloped silver to reflective, non-filamentary silver at the nuclei sites on the surface. The reflective layer contains from 20% to 50% silver particles of which 1% to 50% may be filamentary silver formed in the initial development step. Beneath the reflective layer is an absorptive underlayer.

The reflective surface layer is characterized by non-filamentary particles 28 overlying a concentration of filamentary particles which form the absorptive underlayer. Separating the data strip from the image area is an unprocessed silver halide buffer area 30 which would remain generally clear since it is neither exposed nor developed. The buffer area 30 is not necessary, but is desirable because chemical processing of data strip 17 differs from the processing of image area 15. The buffer area 30 may be fixed to remove silver halide so that the area will remain clear. This is optional. Both processes may occur by spraying of chemicals onto the surface of the film, with a mask covering buffer area 30. Such spray processing is well known in photolithography. However, in the present case it may be necessary to proceed in two steps. In the first step, conventional photographic processing of image area 26 takes place. Subsequently, the image area, together with the buffer area 30 is masked to allow separate processing of the data strip 28. After processing is complete, a transparent plastic layer 32 is adhered to the emulsion, forming a protective layer. Layer 32 may be any of the well known plastic protective layers. The remainder of the film, apart from the data strip 17, need not have fine grain size. Data strip 17 can also be added to the photographic material in the form of an adhesive tape which is bonded to the photographic material either before or after the photograph is developed, or both can be bonded separately to a wallet-size card.

Figure 4:
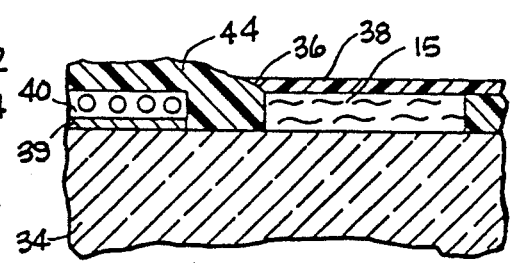

FIG. 4 is similar to FIG. 3 except that substrate 34 is coated only with silver halide emulsion to the right of line 36. The image area 15 is exposed, developed and fixed. A protective coating 38 may then be applied. A pre-formed strip 40 of laser recording material may then be disposed on the substrate. This may be a strip of DREXON material, previously mentioned. Such a preformed strip of laser recording material would have its own thin substrate 39 carrying the emulsion layer. Alternatively, the recording material could be any of the other direct-read-after-write laser recording materials, for example such as that described in U.S. Pat. No. 4,230,939 issued to DeBont, et al., where the patent teaches a thin metallic recording layer of reflective metal such as Bi, Te, In, Sn, Cu, Al, Pt, Au, Rh, Sb, Ge, Se, Ga. Materials which are preferred are those having high reflectivity and low melting point, particularly Cd, Sn, Tl, In, Bi and amalgams. These materials may be premanufactured on a very thin substrate and adhered to the substrate by means of subbing layer. After adhering the laser recording material to the substrate, a transparent protective coating 44 is applied. This coating material may be the same as protective material 38.

Figure 5:
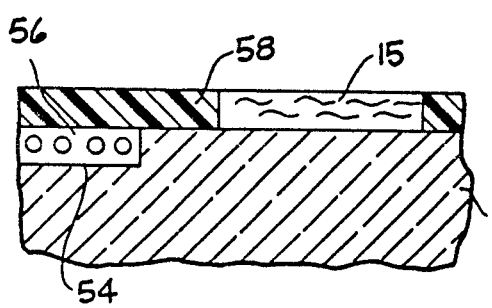

With reference to FIG. 5, substrate 52 has a notch or groove 54 which allows placement of a laser recording material 56 therein. This laser recording material may be processed in situ from silver halide material previously existing in the groove, as in the case of FIG. 3, or pre-existing laser recording material which is placed in the groove, as with the pre-existing laser recording material of FIG. 4. In either case, the photographic image area 15 is exposed and developed in the usual way, while an unexposed and undeveloped area 58 protects data strip 56. Since emulsion area 58 is unexposed and undeveloped, it remains clear and forms a protective layer over the data strip.

Figure 6:
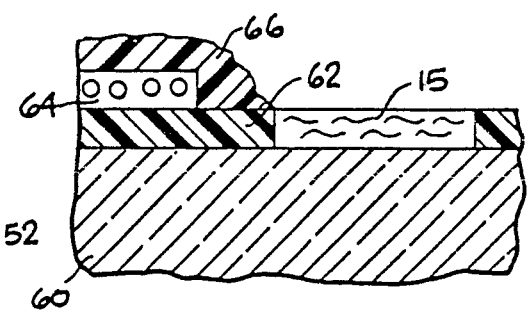

In the embodiment of FIG. 6, no groove exists in substrate 60. Rather, a photographic image area 15 is exposed and developed in the usual way, with the remainder of the substrate being covered with emulsion which is masked and protected from exposure and development, forming a protected region 62. On top of the protected region 62 a strip of laser recording material 64 is positioned. This laser recording material may be formed in situ by application of a silver halide emulsion strip which is then processed, as data strip 17 in FIG. 3 is processed, or may be a pre-formed strip which is applied as in FIG. 4. The strip is then covered with a protective layer 66.

Figures 7, 8:
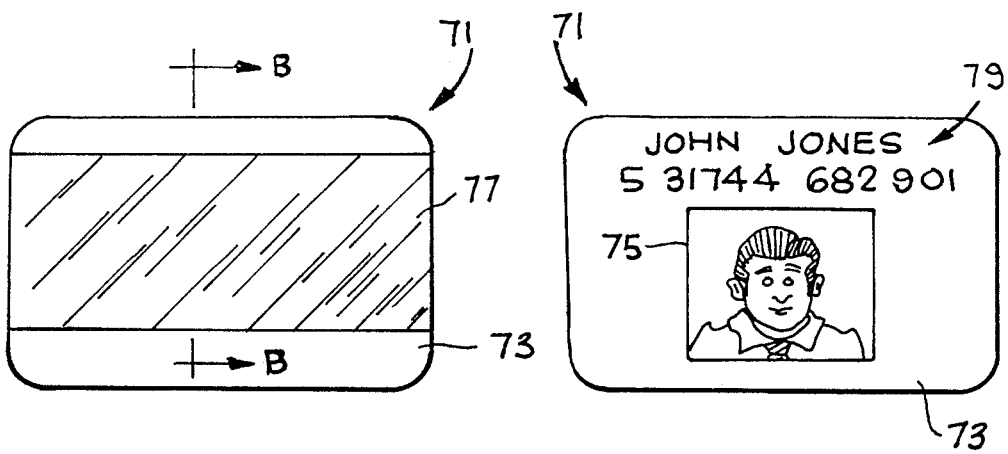
FIG. 7 is a top view of the personal information card of the present invention.
FIG. 8 is a bottom view of the card of FIG. 7.

With reference to FIGS. 7 and 8, a personal information card 71 is illustrated having a size common to most credit cards. The width dimension of such a card is approximately 54 mm and the length dimension is approximately 85 mm. These dimensions are not critical, but preferred because such a size easily fits into a wallet and has historically been adopted as a convenient size for automatic teller machines and the like. The card's base 73 is a dielectric, usually a plastic material such as polyvinylchloride or similar material. Polycarbonate plastic is preferred. The surface finish of the base should have low specular reflectivity, preferably less than 10 percent. Base 13 carries a photographic or laser recordable visual image medium 75 on one side of the card and an optical data strip 77 on the opposite side of the card from medium 75.

Photographic medium 75 has a visual image, which can be a conventional photographic image produced by usual photographic techniques, typically by exposure and development of the medium. Alternatively, when medium 75 is a piece of laser recordable material, a laser can be used to create eye-readable visual images. The images may occupy the entirety of the medium 75 or discrete areas as shown in FIG. 8. A single image may be disposed on the visual image medium. Alternatively, several images may be on the medium. For example, user identification indicia 79, such as name, card number and card expiration date may be provided along with a face photograph or fingerprint photograph. Alternatively, the indicia 79 may be embossed on either surface of the card.

Strip 77 is preferably disposed on a side of the card opposite that containing the visual image medium 75. Whereas strip 17 in FIG. 1 disposed is side-by-side relationship to image area 15 is typically about 15 millimeters wide to avoid overlapping with image area 15, the optical data strip 77 in FIG. 7 may be larger, typically about 35 mm wide. Strip 77 may also have other sizes and orientations. In any case, strip 77 has a data capacity which is at least as great as, and often more than twice that of the capacity of strip 17 in FIG. 1. The strip is relatively thin, approximately 100–500 microns, although this is not critical.

Figures 9, 10:
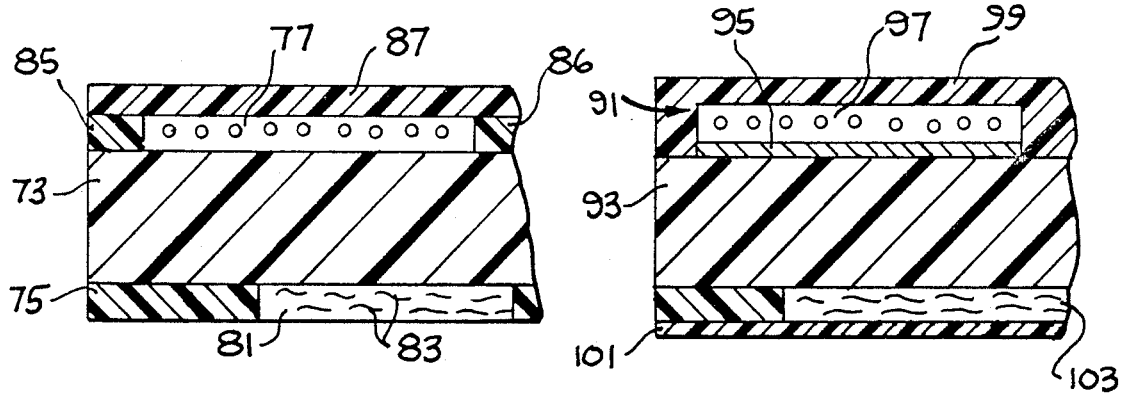
FIGS. 9–11 are alternate sectional constructions of the card of FIG. 7 taken along lines B—B in FIG. 7.

FIG. 9 illustrates a first construction of the card shown in FIGS. 7 and 8, and is similar to FIG. 3 except that card base 77 is generally nontransparent and the photographic or laser recordable visual image material 75 is disposed on the opposite side of the card from strip 77. Applied to card base 77 is a photographic material 75, comprising an emulsion layer, made according to techniques well known in the photographic art. Note that the card base itself becomes the substrate for the emulsion layer and should carry an appropriate subbing layer, as well as a moisture barrier layer. For the latter purpose, a very thin film of Aclar may be used having a thickness of about one mil. No separate film base layer is used in order to minimize thickness of the card. Photographic images 81 are made by exposure and development in the usual way. The wavy lines 83 represent filamentary black silver particles which characterize normal photographic images. Visual images may also be made by a laser. Said laser recorded visual images are typically made of a plurality of laser created spots, which alter the surface reflectivity of the recording medium.

Data strip 77 may be any of several laser recording materials. For example, it could be a reflective silver/gelatin layer converted from a fine grain silver halide emulsion by a silver diffusion transfer process, as described above with reference to FIG. 3. Areas 85 and 86 are not subject to this process. After processing is complete, a transparent layer 87 is applied to the emulsion, forming a protective layer. Layer 87 may be any of the well known protective layers, such as acrylates. Data strip 77 can be bonded to the card base 73 either before or after the photographic material 75 is developed.

FIG. 10 is similar to FIG. 9 except that a pre-formed strip 91 may be disposed on a card base 93. This strip may be any of the direct-read-after-write laser recording materials described above with reference to FIG. 4. Such a pre-formed strip 91 would have its own substrate 95 carrying the emulsion or thin metallic recording layer 97. After adhering the pre-formed strip 91 to the card base 93, a transparent protective coating 99 is applied. A transparent protective layer 101 may also be applied over the visual image medium 103, or any of the other image media in FIGS. 9 and 11. The protective layers 99 and 101 may be any of the well known protective layers, such as acrylates.

Figure 11:
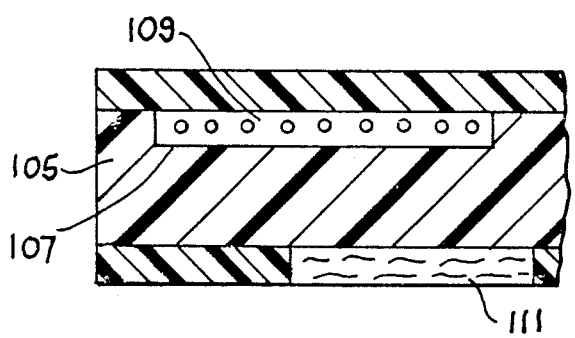

With reference to FIG. 11, card base 105 has a notch or groove 107 which allows placement of a laser recording material 109 therein. This laser recording material 109 may be created in situ from silver halide material previously existing in groove 107, as in the case of FIGS. 3 and 9, or preexisting laser recording material may be placed in the groove, as with the preexisting laser recording materials of FIGS. 4 and 10. In either case, the photographic emulsion material 111, having a construction and placement similar to emulsion layer 83 in FIG. 9, is exposed and developed in the usual way. In all cases, the preferred total thickness of the card conforms to ISO standards for credit cards or bank cards, although other thicknesses may also be used.

Figure 12:
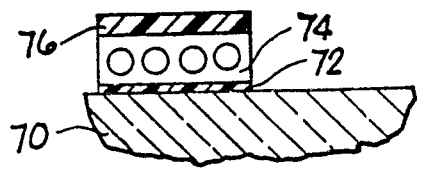
FIG. 12 is a partial sectional view of an alternate embodiment of the medium of FIG. 1.

With reference to FIG. 12, a substrate 70 is shown which carries a photographic image in a substrate portion not shown. This image may be above the substrate surface or withing a groove of the substrate, as previously mentioned. The substrate carries a secondary substrate 72 which is a thin flexible material, only a few mils thick, carrying a laser recording material 74. The secondary substrate 72 is adhered to the primary substrate 70 by means of an adhesive or sticky substance, similar to dry adhesives found on tape. The laser recording material may be any of the materials previously discussed, such as DREXON material, except that the secondary substrate 72 is substituted for the substrate previously mentioned. A protective layer 76 is adhered over the laser recording material. The laser recording material rests above developed silver halide emulsion, resembling FIG. 6, except that the visual image emulsion is completely exposed and developed in the region underlying the secondary substrate.

In all of these embodiments, a strip of laser recording material is disposed on a card along with one or more visual images for providing data storage for data related to the same person associated with the photo image. Remarks in the form of alphanumerics, voice or digitized pictures or signature may be laser recorded adjacent to the photographic image. By this means these two forms of communication will not be separated. Information about the person is complimentary to the photo image on the card. For example, transaction information related to a person may be recorded on the card. Such transaction information could be banking information, such as a record of deposits and withdrawals. In former years, such transactions were recorded in a passbook, but because of the amount of time taken for sequential entries in a passbook and because of automation, passbook banking was abandoned, even though it was more favorable to consumers. Now, sequential transactions may be recorded automatically so that a consumer may once again have a complete record of prior transactions, although a card reader is necessary. The visual image on the card provides for security and guards against fradulent transactions. Insurance transactions, immigration matters and the like all involve sequential transactions involving personal data. While it is important to record the transaction, it is also important to relate the transaction to eye-readable personal data so that a human judgement may be formed. For this purpose, a visual image of a face or fingerprint assists in forming a human judgement relating to the validity of the transaction. Prior to execution of a transaction, the identity of a user is checked against the personal information on the back side of the card. Both sides of the card are read by a machine. Once the user's identity is verified by a human judgment, or that of a machine comparing user charactereistics, such as fingerprints, then a transaction is entered on the data strip.

Of course, while the photo images may be read by conventional means, low-powered laser or a photodetector array apparatus must be used to read the data strip. A laser apparatus is illustrated in FIG. 13, which illustrates the side view of the lengthwise dimension of the medium of FIG. 1 or 7, consisting of a data strip in combination with photo images on a card.

Figure 13:
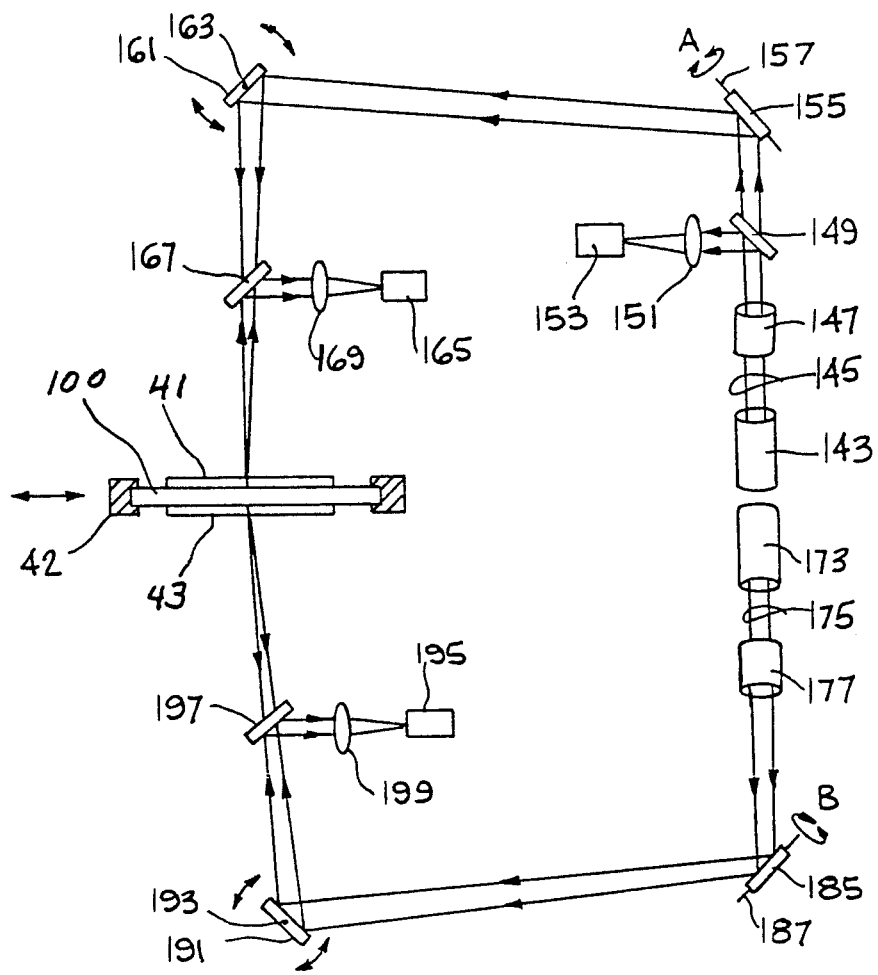
FIG. 13 is a plan view of optical apparatus for reading and writing on the data strip portion of the medium illustrated in FIGS. 1 and 7.

In FIG. 13, a side view of the lengthwise dimension of a card is shown. The optical system shown represents one embodiment of a laser read/write system. The card has a first data strip 41 and an eye readable image 43 adhered to opposite sides of card 100. Strip 41 is laser recordable, in situ, while image 43 is a prerecorded eye readable image. The card is usually received in a movable holder 42 which brings the card 100 into the trajectories of the beams. Laser light source 143 is preferably a pulsed semiconductor laser of near infrared wavelengths emitting beam 145 which passes through collimating and focusing optics 147. Light source 173 is either a laser or light emitting diode of near infrared wavelengths which emits beam 175 which passes through collimating and focusing optics 177. Beam 145 may be either a read beam or a write beam. Beam 175 may be only a read beam. In the read mode, laser power of beam 145 is lowered to about 5% of the record power. Beam 145 is sampled by a beam splitter 149 which transmits a portion of the beam through a focusing lens 151 to a photodetector 153. The detector 153 confirms laser writing and is not essential.

The beams 145 and 175 are then directed to first servo controlled mirrors 155 and 185 respectively. Mirror 155 is mounted for rotation along axis 157 in the direction indicated by arrows A. Likewise, mirror 185 is mounted for rotation along axis 187 in the direction indicated by arrows B. The purpose of mirrors 155 and 185 is to find the lateral edges of the laser recording material in the coarse mode of operation and then in a fine mode of operation identify data paths which exist predetermined distances from the edges.

From mirrors 155 and 185, the beams 145 and 175 are directed toward mirrors 161 and 191 respectively. Mirror 161 is mounted for rotation at pivot 163, while mirror 191 is also mounted for rotation at pivot 193. The purpose of mirrors 161 and 191 is for fine control of motion of the beams along the length of the card. Coarse control of the lengthwise position of the card relative to the beams is achieved by motion of movable holder 42. The position of the holder may be established by a linear motor adjusted by a closed loop position servo system of the type used in magnetic disk drives.

Mirrors 155, 185, 161 and 191 may be under independent servo control. The servos for mirrors 155 and 161 are linked by software to the servos for mirrors 185 and 191 to allow simultaneous reading or reading and writing of data strip 41 and 43. Alternatively, mirrors 155, 185, 161 and 191 may be mechanically linked, so that one servo controls mirrors 155 and 185, while another servo controls mirrors 161 and 191. Note that mirrors 161 and 191 pivot about axes 163 and 193 respectively. In simultaneous reading and writing of strip 41 and 43, information is recorded on strip 41 at a position corresponding to the position of the next transaction in a series of transactions. Both the strip and the eye readable image are read simultaneously from respective positions on the two strips.

In addition to text the card may be prerecorded with a preinscribed pattern containing servo tracks, timing marks, program instructions, and related functions.

These positioning marks can be used as a reference for the laser recording system to record or read data at particular locations. U.S. Pat. No. 4,304,848 decribes how formatting may be done photolithographically. Formatting may also be done using laser recording or surface molding of the servo tracks, having marks, programming and related functions. Dil, in U.S. Pat. No. 4,209,804 teaches a type of surface molding. Reference position information may be prerecorded on the card so that position error signals may be generated and used as feedback in motor control. Upon reading one data path, the mirror 157 is slightly rotated. The motor moves holder 41 lengthwise so that the path can be read, and so on.

As light is scattered and reflected from spots in the laser recording material, the reflectivity of the beam changes relative to surrounding material where no spots exist. The beam should deliver sufficient laser energy to the surface of the recording material to create spots in the data writing mode, but should not cause disruption of the surface so as to cause difficulty in the data reading mode. The wavelength of the laser should be compatible with the recording material to achieve this purpose. In the read mode, power is approximately 5% to 10% of the recording or writing power.

Differences in reflectivity between a spot and surrounding material are detected by light detector 165 which may be a photodiode. Light is focused onto detector 165 by beam splitter 167 and focusing lens 169. Servo motors, not shown, control the positions of the mirrors and drive the mirrors in accord with instructions received from control circuits, as well as from feedback devices. The detector 165 produces electrical signals corresponding to pits. Other optics, including beamsplitter 197, focusing lens 199 and camera 195 are used to observe the photo images, while data is being read or written on the data strip.

A photodetector array such as a CCD could also be used, rather than camera 195. It could be either a linear array or area array. The number of detector elements per track would be approximately three elements to create a reading redundancy. The surface would be illuminated with low-cost, light-emitting diodes generating power primarily in the near infra-red to match the sensitivity specturm of the photodetector array.

What is claimed is:

1. A data card transaction system comprising,
    a wallet-size card having opposed, planar, major surfaces,
    an in situ, laser recordable strip disposed on one of said surfaces and a visually readable image disposed on an image medium on the opposite surface, and
    optical means for reading both sides of said card while said card remains operatively associated with said optical means.

2. The transaction system of claim 1 wherein said laser recordable strip comprises DREXON material.

3. The transaction system of claim 1 wherein said image medium is a silver-halide emulsion layer disposed over the card base without an intervening film base layer.

4. The transaction system of claim 3 wherein said visually readable image in said emulsion layer is a face photograph.

5. The transaction system of claim 1 wherein said optical means comprises a pair of lasers with means for simultaneously scanning opposed major surfaces of the card.

6. The transaction system of claim 1 wherein said optical means comprises a photodetector and a camera.

7. The transaction system of claim 1 further defined by means for laser recording transaction data on said laser recordable strip.

8. A data card transaction system comprising,
    a wallet-size card having opposed, planar, major surfaces including a first surface with a strip of in-situ, laser recording material thereon, and an image medium for visually readable information disposed on a second major surface of the card,
    a reading and writing beam means disposed in writing relation with respect to said strip for writing sequential data thereon,
    a first light detector means disposed in reading relation to said strip for reading sequential data,
    a reading beam means disposed in reading relation with respect to said image medium for shining reading light on said second major surface,
    a second light detector means disposed in reading relation to said image medium for detecting said visually readable information, and
    means providing relative motion between said beams and the card for reading and writing said information on the card.

9. The system of claim 8 wherein said reading and writing beams and said reading beam means are disposed for simultaneous operation on opposite sides of said card.

10. The system of claim 8 wherein said second light detector means is a camera.

11. A method for recording personal information on a wallet-size card comprising,
    creating visually readable information on an optical recording medium, said information relating to a person,
    disposing said visually readable information on a first side of a wallet-size card,
    disposing a laser recordable optical data storage lamella on a second side of said card, said second side opposite said first side, and
    recording information indicia related to said person onto said lamella, in situ, by means of laser.

12. The method of claim 1 wherein said optical recording medium is a photographic medium.

13. The method of claim 1 wherein said optical recording medium is a laser recording medium.

14. A multilayer data card comprising,
    a planar substrate having opposed major surfaces,
    a layer of photosensitive material being photographically exposed and developed disposed over at least part of a major surface of the substrate, said material layer bearing visually readable information, and
    a direct-read-after-write optical data storage layer disposed over a portion of the photosensistive material layer, said data storage layer recordable in situ with a laser.

15. A multilayer data card comprising,
    a planar substrate having opposed major surfaces,
    a direct-read-after-write optical data storage layer disposed over part of a major surface of the substrate, said data storage layer recordable in situ with a laser, and
    a layer of photosensitive material being photographically exposed and developed disposed over the optical data storage layer, said material layer having a first portion bearing visually readable information optically adjacent to said optical storage layer and having a second portion with an optically transmissive zone over the optical storage layer.

* * * * *

UNITED STATES PATENT AND TRADEMARK OFFICE
CERTIFICATE OF CORRECTION

PATENT NO. : 4,745,268
DATED : May 17, 1988
INVENTOR(S) : Jerome Drexler

It is certified that error appears in the above-identified patent and that said Letters Patent is hereby corrected as shown below:

Claim 12, column 10, line 44, "claim 1" should read
- - claim 11 - -.

Claim 13, column 10, line 46, "claim 1" should read
- - claim 11 - -.

Signed and Sealed this

Twenty-eighth Day of November 1989

Attest:

JEFFREY M. SAMUELS

Attesting Officer        Acting Commissioner of Patents and Trademarks